(12) United States Patent
Hou et al.

(10) Patent No.: US 11,782,302 B2
(45) Date of Patent: Oct. 10, 2023

(54) DISPLAY DEVICE

(71) Applicant: WUHAN CHINA STAR OPTOELECTRONICS TECHNOLOGY CO., LTD, Wuhan (CN)

(72) Inventors: Shaojun Hou, Wuhan (CN); Xindong Mei, Wuhan (CN); Chao Wang, Wuhan (CN); Guanghui Liu, Wuhan (CN)

(73) Assignee: WUHAN CHINA STAR OPTOELECTRONICS TECHNOLOGY CO., LTD, Wuhan (CN)

( * ) Notice: Subject to any disclaimer, the term of this patent is extended or adjusted under 35 U.S.C. 154(b) by 672 days.

(21) Appl. No.: 16/955,123

(22) PCT Filed: Apr. 3, 2020

(86) PCT No.: PCT/CN2020/083179
§ 371 (c)(1),
(2) Date: Jun. 18, 2020

(87) PCT Pub. No.: WO2021/168994
PCT Pub. Date: Sep. 2, 2021

(65) Prior Publication Data
US 2023/0097654 A1 Mar. 30, 2023

(30) Foreign Application Priority Data
Feb. 26, 2020 (CN) .......................... 202010120538.1

(51) Int. Cl.
G02F 1/1333 (2006.01)
G02F 1/1335 (2006.01)
G02F 1/13357 (2006.01)

(52) U.S. Cl.
CPC .... *G02F 1/13338* (2013.01); *G02F 1/133512* (2013.01); *G02F 1/133514* (2013.01); *G02F 1/133531* (2021.01); *G02F 1/133603* (2013.01)

(58) Field of Classification Search
CPC ........... G02F 1/13338; G02F 1/133514; G02F 1/133531; G02F 1/133603
USPC ....................................................... 349/61–68
See application file for complete search history.

(56) References Cited

U.S. PATENT DOCUMENTS

| 11,057,554 B2* | 7/2021 | Nakamura | ........ G02F 1/133512 |
| 2017/0183367 A1* | 6/2017 | Metz | ...................... C09K 11/06 |
| 2018/0316835 A1* | 11/2018 | Files | ...................... H04N 23/57 |
| 2019/0153713 A1 | 5/2019 | McMillan et al. | |

(Continued)

FOREIGN PATENT DOCUMENTS

| CN | 106371187 A | 2/2017 |
| CN | 108681131 A | 10/2018 |

(Continued)

*Primary Examiner* — Charles S Chang
(74) *Attorney, Agent, or Firm* — PV IP PC; Wei Te Chung; Zhigang Ma

(57) ABSTRACT

A display device includes an optical film having a via hole; a display panel disposed on a surface of a side of the optical film, and the display panel comprises a transparent area opposite to the via hole; a camera inserted into the via hole and facing the transparent area; and a transparent light source located within the via hole and between the camera and the transparent area.

8 Claims, 2 Drawing Sheets

(56) References Cited

U.S. PATENT DOCUMENTS

2020/0186688 A1* 6/2020 Chen .................. H04N 23/54
2020/0292882 A1* 9/2020 Nakamura ........ G02F 1/133608

FOREIGN PATENT DOCUMENTS

| CN | 108885376 A | 11/2018 |
| CN | 110161749 A | 8/2019 |
| CN | 110231735 A | 9/2019 |
| CN | 110286521 A | 9/2019 |
| CN | 110426878 A | 11/2019 |
| CN | 110456571 A | 11/2019 |
| CN | 110474998 A | 11/2019 |
| JP | H08220515 A | 8/1996 |

* cited by examiner

DISPLAY DEVICE

BACKGROUND OF INVENTION

Field of Invention

The present invention relates to the field of display technology, and more particularly, to a display device.

Description of Prior Art

With the continuous development of display technology, people pursue better display effects. Terminal equipment, like mobile phones, tablets, etc., with a high-display ratio display, have become a mainstream trend. Due to the lighting requirements of some functional devices in the terminal equipment, such as cameras and light sensors, it is difficult to achieve the best display ratio for the display displays.

Currently, displays having a notch, water drop displays, and hole displays have high display ratios, but they may sacrifice a part of the display space, and the lighting devices is directly exposed on the display. In the prior art, an under-display camera is adopted. The camera is generally disposed at an edge of the display or a corner of the imaging area. This area has no pixel unit or light source and cannot be used to display images, which affects the user experience. Currently, there are also full displays with lifting cameras and sliders in the market. However, these need to add additional module or increase the thickness of the device, so the consumer experience is not well. Liquid crystal displays (LCDs) are one of the mainstream display technologies in the current display market. It is worth exploring and researching how to realize LCDs with full displays.

Organic light-emitting diodes (OLED) are also known as organic electroluminescence displays and organic light-emitting semiconductors. The OLED belongs to a current-type organic light-emitting device, which emits light through carrier injection and recombination. Under action of the electric field in the OLEDs, the holes generated by the anode and the electrons generated by the cathode can move, and are injected into the hole transport layer and the electron transport layer, and then migrated to the light-emitting layer. When the holes and the electrons are combined in the light-emitting layer, energy excitons are generated, thereby exciting the light-emitting molecules to generate visible light. The OLEDs with TFT backplate can be adopted in the display industry. In addition, the OLEDs can also be adopted in the lighting industry without TFT backplate. The transparent OLEDs are used to replace cathode and anode of the OLEDs with high transmittance materials to achieve transparency effects, so the cathode and anode of the OLEDs are transparent when the OLEDs do not emit light.

SUMMARY OF INVENTION

A display device comprises an optical film comprising a via hole; a display panel disposed on a surface of a side of the optical film, wherein the display panel comprises a transparent area opposite to the via hole; a camera inserted into the via hole and facing the transparent area; and a transparent light source located within the via hole and between the camera and the transparent area.

In one embodiment, the display panel comprises an array substrate; a color filter substrate disposed opposite to the array substrate; a liquid crystal layer disposed between the array substrate and the color filter substrate; a first polarizer disposed on a surface of a side of the color film substrate away from the array substrate; and a second polarizer disposed a surface of a side of the array substrate away from the color filter substrate.

In one embodiment, the transparent area comprises a first transparent part located in the first polarizer; a second transparent part located in the color film substrate; a third transparent part located in the liquid crystal layer; a fourth transparent part located in the array substrate; and a fifth transparent part located in the second polarizer. The first transparent part, the second transparent part, the third transparent part, the fourth transparent part, and the fifth transparent part are disposed corresponding to each other.

In embodiment, the display device further comprises a light-blocking film disposed on an inner side wall of the via hole.

In one embodiment, the optical film comprises a first film; a second film disposed on a surface of a side of the first film; and a third film disposed on a surface of the second film away from the first film.

In one embodiment, the via hole comprises a first via hole penetrating through the first film; a second via hole penetrating through the second film; and a third via hole penetrating through the third film. The first via hole, the second via hole, and the third via hole are disposed corresponding.

In one embodiment, the transparent light source comprises a substrate, an anode layer, a hole injection layer, a hole transport layer, a light-emitting layer, an electron transport layer, an electron injection layer, and a cathode layer disposed in order.

In one embodiment, a voltage is generated between the cathode layer and the anode layer.

In one embodiment, the anode layer is made of a transparent material, and the cathode layer is made of a transparent material or a translucent material.

In one embodiment, the display device further comprises a light emitting diode (LED) light bar on a side of the optical film.

The technical effect of the present invention is that setting the camera under the display can further increase the display ratio of the display device. When the transparent light source is turned off, the imaging area is in the lighting state and can work normally. When the transparent light source is turned on, the imaging area is in the display state. At the same time, the large display area improves the user's experience.

BRIEF DESCRIPTION OF DRAWINGS

The technical solutions and other beneficial effects of the present invention are described through the detailed description of the specific embodiments of the present invention in conjunction with accompanying drawings.

Figure 1:
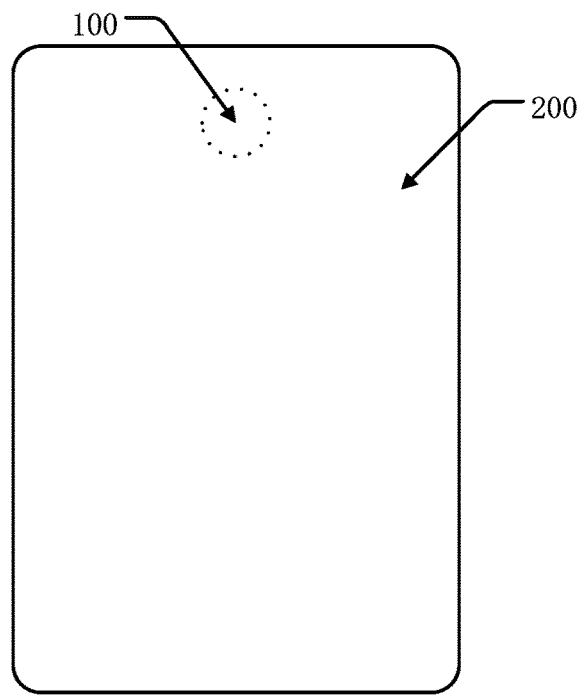
FIG. 1 is a schematic view of a display device when the imaging area is in the lighting state according to one embodiment of the present invention.
Figure 2:
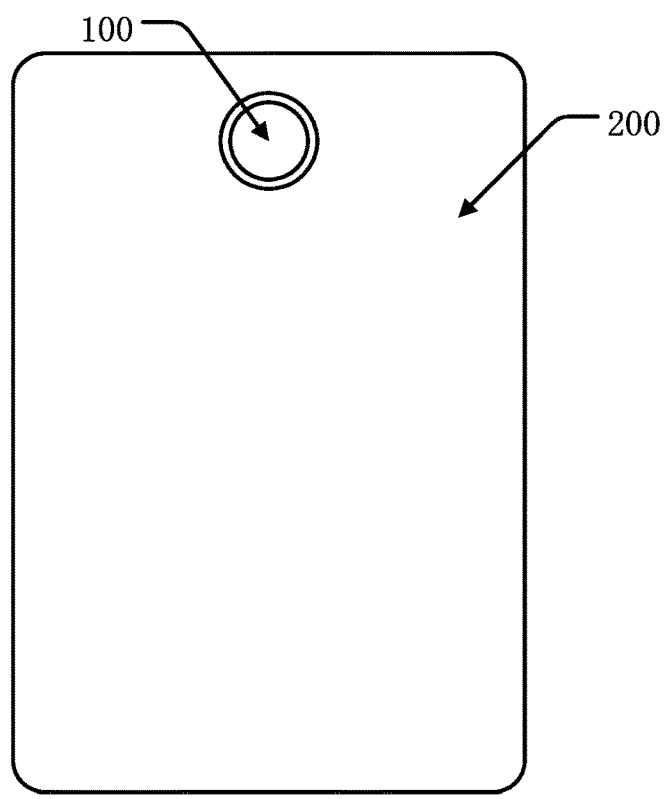
FIG. 2 is a schematic view of the display device when the imaging area is not in the lighting state according to one embodiment of the present invention.

REFERENCE NUMERALS imaging area 100; display area 200; camera 11; light-blocking film 12; transparent light source 13; transparent area 14; light guide component 15; substrate 131; anode layer 132; hole injection layer 133; hole transport layer 134; light-emitting layer 135; electron transport layer 136; electron injection layer 137; cathode layer 138; first transparent part 141; second transparent part 142; third transparent part 143; fourth transparent part 144; fifth transparent part 145; optical film 21; display panel 22; light emitting diode (LED) light bar 23; first film 211; second film 212; third film 213; first reflective sheet 221; array substrate 222; liquid crystal layer 223; color filter substrate 224; and second reflective sheet 225.

DETAILED DESCRIPTION OF PREFERRED EMBODIMENTS

The technical solutions in the embodiments of the present application will be described clearly and completely with reference to the drawings in the embodiments of the present application. Obviously, the described embodiments are only a part of the embodiments of the present application, but not all the embodiments. Based on the embodiments in the present application, all other embodiments obtained by those skilled in the art without making creative work fall within the protection scope of the present application.

In the description of this application, it should be understood that the terms "center," "longitudinal," "transverse," "length," "width," "thickness," "upper," "lower," "front," "back" "left," "right," "vertical," "horizontal," "top," "bottom," "inside," "outer," "clockwise," "counterclockwise," etc. The positional relationship is based on the orientation or positional relationship shown in the drawings, and is only for the convenience of describing this application and simplifying the description, rather than indicating or implying that the device or element referred to must have a specific orientation, be constructed and operated in a specific orientation, Therefore, it cannot be understood as a limitation to this application. In addition, the terms "first" and "second" are used for description purposes only, and cannot be understood as indicating or implying relative importance or implicitly indicating the number of technical features indicated. Thus, the features defined as "first" and "second" may explicitly or implicitly include one or more of the features. In the description of this application, the meaning of "plurality" is two or more, unless otherwise specifically limited.

In the description of this application, it should be noted that, unless otherwise clearly specified and limited, the terms "installation," "link," and "connection" should be understood in a broad sense, for example, it can be fixed or detachable Connected, or integrally connected; it can be mechanical, electrical, or can communicate with each other; it can be directly connected, or it can be indirectly connected through an intermediary, it can be the connection between two elements or the interaction of two elements relationship. Those of ordinary skill in the art can understand the specific meanings of the above terms in this application according to specific situations.

In this application, unless otherwise clearly specified and defined, the first feature "above" or "below" the second feature may include the first and second features in direct contact, or may include the first and second features Contact not directly but through other features between them. Moreover, the first feature is "above", "on" and "over" the second feature includes that the first feature is directly above and obliquely above the second feature, or simply means that the first feature is higher in level than the second feature. The first feature is "below," "under," and "underneath" the second feature includes that the first feature is directly below and obliquely below the second feature, or simply means that the first feature is less horizontal than the second feature.

The following disclosure provides many different embodiments or examples for implementing different structures of the present application. In order to simplify the disclosure of the present application, the components and settings of specific examples are described below. Of course, they are only examples, and the purpose is not to limit this application. In addition, the present application may repeat reference numerals and/or reference letters in different examples. Such repetition is for simplicity and clarity, and does not itself indicate the relationship between the various embodiments and/or settings discussed. In addition, the present application provides examples of various specific processes and materials, but those of ordinary skill in the art may be aware of the application of other processes and/or the use of other materials.

Referring to FIG. 1 to FIG. 5, a display device, includes an imaging area 100 and a display area 200. The imaging area 100 includes a camera 11, a light-blocking film 12, a transparent light source 13 and a transparent area 14. The display area 200 includes an optical film layer 21, a display panel 22, and an LED light bar 23.

Figure 3:
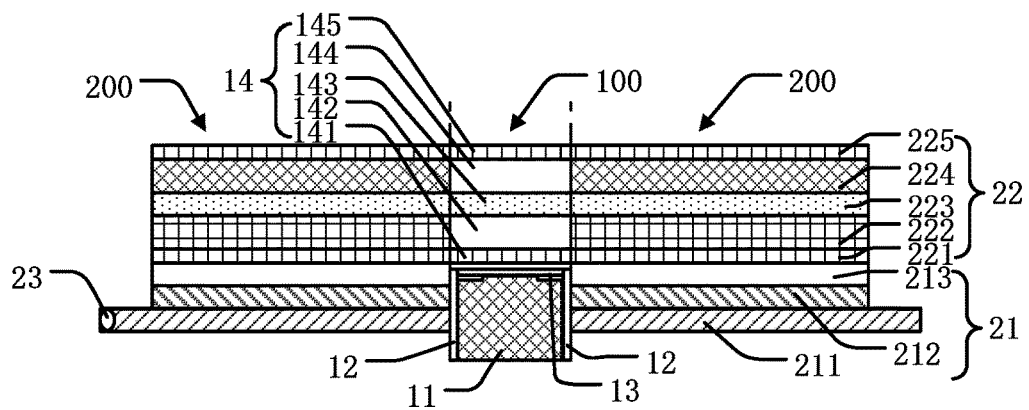
FIG. 3 is a schematic view of the display device according to one embodiment of the invention.

As shown in FIG. 3, the optical film layer 21 includes a first film layer 211, a second film layer 212, and a third film layer 213 to realize reflection, guidance, and diffusion of light.

The first film 211 is a reflective sheet with reflective functioning to reflect the outgoing light from light emitting diode (LED) light bar 23 and then emitting, so as to prevent the light from being transmitted downward and improve light utilization.

The second film 212 is disposed on an upper surface of the first film 211, and is a light guide plate, which plays a role in guiding light. In this embodiment, the backlight module of the display device is an edge-type backlight module, so the LED light bar 23 is disposed on a side of the optical film 21. After the light is emitted from the LED light bar 23, it enters the second film 212, which is the light guide plate, most of the light is emitted upward, even if a small amount of the light is emitted from lower side of the light guide plate, it will be reflected upward by the reflection sheet located under the light guide plate. There is also a small amount of the light that enter a side of the light guide plate and other side of the light guide plate opposite to the light entrance side, because the other side of the light guide plate side is provided with a light-blocking film 12, so it will not further penetrate into the imaging area 100, which improves a certain exitance of light.

The third film 213 is disposed on an upper surface of the second film 212. The third film layer 213 is a diffusion sheet, so that the incident light is uniformly diffused and then emitted.

A via hole is formed in the optical film 12 for placing the camera and other components. The first via hole penetrates through the first film 211, the second via hole penetrates through the second film 212, and the third via hole penetrates through the third film 213. The first via hole, the second via hole, and the third via hole are oppositely formed and connected with each other. Preferably, the inner diameters of the first via hole, the second via hole, and the third via hole are equal, so that the imaging area 100 and the display area 200 are more likely to be closely adhered to each other.

A display panels includes a first polarizer 221, an array substrate 222, a liquid crystal layer 223, a color filter substrate 224, and a second polarizer 225. The display panel 22 realizes a display function.

The first polarizer 221 is disposed on the upper surface of the third film 213 and has a polarizing function. The array substrate 222 is disposed on the upper surface of the first polarizer 221 and is a circuit switch of the display device. The color filter substrate 224 is disposed above the array substrate 222 and opposite to the array substrate 222. The color filter substrate 224 includes an RGB color resist, a black matrix, a spacer, a cover plate, etc. The liquid crystal layer 223 is disposed between the array substrate 222 and the color filter substrate 224. The second polarizer 225 is disposed on the upper surface of the color filter substrate 224 and has a polarizing function.

The transparent area 14 penetrates through the display panel 22 and is disposed opposite to the via hole. The transparent area 14 includes a first transparent part 141, a second transparent part 142, a third transparent part 143, a fourth transparent part 144, and a fifth transparent part 145. The first transparent part 141 penetrates through the first polarizer 221. The first transparent portion 141 still has a polarizing function, but it is made of a transparent material, which is convenient for light to pass through. The second transparent part 142 penetrates through the array substrate 222. The second transparent part 142 still has the function of controlling the circuit switch, but it is made of a transparent material, which is convenient for light to pass through. The third transparent part 143 penetrates through the liquid crystal layer 223. The third transparent part 143 still has a function of driving liquid crystal, but it is a light-transmissive part to facilitate light to pass through. The fourth transparent part 144 penetrates through the color filter substrate 224. The fourth transparent part 144 is still provided with RGB color resist, black matrix, isolation column, cover plate, etc., which can realize the light filtering, but its material is extremely transparent, which is convenient for light to pass through. The fifth transparent part 145 penetrates through the second polarizer 225. The fifth transparent part 145 still has a polarizing function, but it is made of a transparent material, so as to facilitate light to pass through.

The camera 11 is disposed in the via hole. The camera 11 includes a flexible circuit board, a connector, a photosensitive chip, a filter component, a lens, a support column, a focusing motor, a camera lens, etc.

Figure 4:
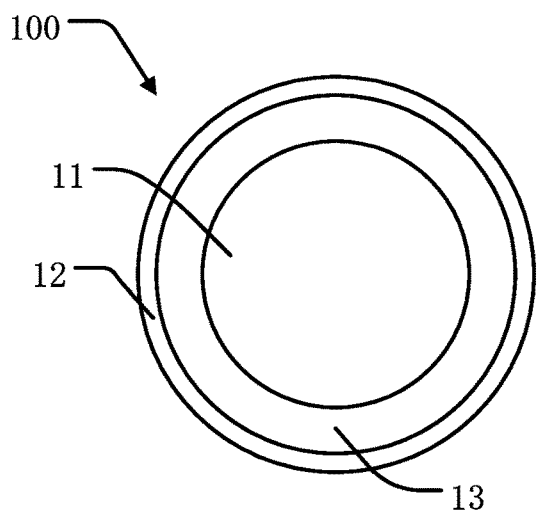
FIG. 4 is a top view of the imaging area according to one embodiment of the invention.

The light-blocking film 12 is attached to the inner side wall of the via hole, and is disposed between the support column 116 and the optical film 21 to block or reflect light, so as to prevent the light emitted from the LED light bar 23 from entering the camera 11. A light-blocking coating or component can be provided by attaching, spraying, printing, etc., or a light-blocking iron frame can also be provided, which can achieve the light-blocking function. FIG. 4 is a top view of the imaging area according to one embodiment of the invention.

Figure 5:
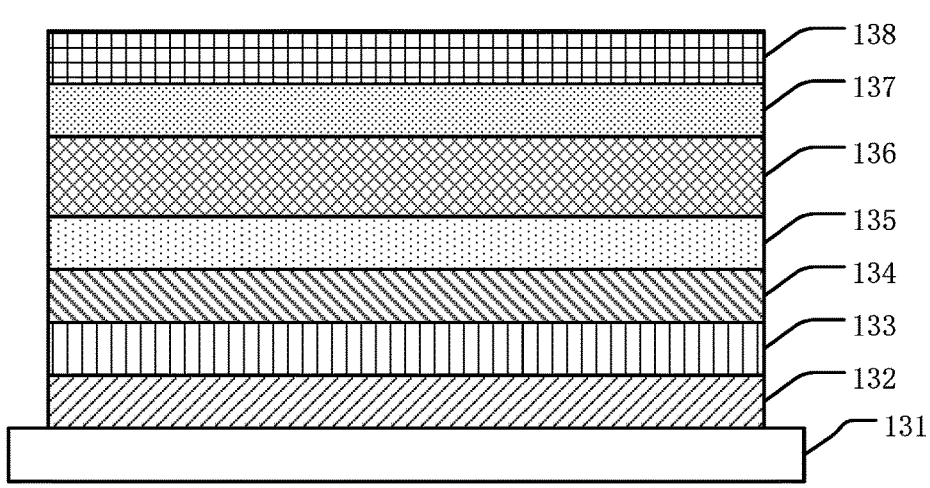
FIG. 5 is a schematic view of a transparent light source according to one embodiment of the present invention.

Referring FIG. 5, the transparent light source 13 includes a substrate 131, an anode layer 132, a hole injection layer 133, a hole transport layer 134, a light-emitting layer 135, an electron transport layer 136, an electron injection layer 137, and a cathode layer 138.

The structure of the transparent light source 13 is basically the same as the structure of the ordinary OLED surface light source. In the embodiment, the transparent light source 13 has no thin film transistor (TFT) backplate, and the cathode layer 138 is made of transparent material or translucent material, preferably is made of high transparency material. The light-emitting layer 135 uses a single light emitting layer to emit white light or multiple light emitting layers and other transparent structures to emit white light. All of them are transparent layers, in which the electron injection layer 137, the electron transport layer 138, the hole injection layer 133, and the hole transport layer 134 are also made of transparent materials. According to the requirements of transparency and performance, they can also be integrated with cathode or anode through ion implantation, doping, evaporation, sputtering and other proc. When the switch is turned on to energize cathode and anode, the light-emitting layer can provide a uniform white surface light source in up and down directions. By adjusting the current, the brightness of the light emitted by the transparent light source of OLED can be controlled. When the light is turned off, the transparent light source of OLED does not provide illumination. The entire transparent light source material has a high transmittance, so external light can pass through the device, and the device looks like a transparent device.

The transparent light source 13 is disposed on the upper surface of the camera 11, and it also can be disposed on the upper surface of the support column or covers the upper surface of the entire camera 11. Because the support column is a ring-shaped support column, the transparent light source 13 also surrounds the lens and is evenly distributed on the support column. The transparent light source 13 can also be connected to the relevant control components, such as flexible circuit board or the photosensitive component through lead wire, which can realize the synchronous control of the transparent light source 13 and the camera 11. In other words, when the camera 11 is working, the transparent light source 13 can be controlled to be turned off to realize the camera function. When the camera 11 is turned off, the transparent light source 13 can be controlled to start working, so that the camera area 100 can be normally displayed, so as to realize a full display.

When the transparent light source 13 is turned on, the imaging area 100 turns on the backlight mode. At this time, the light-emitting device such as photosensitive chip is in a non-working state, that is, no light is taken, because the transparent area 14 of the imaging area 100 is still provided with an array substrate and a color filter substrate, a liquid crystal layer, and other related components, which can realize the function of light-emitting display. Therefore, the imaging area 100 can display normally, and the display area 200 is in the normal display state, so as to realize a full display (see FIG. 1).

When the transparent light source 13 is turned off, the imaging area 100 turns off the backlight mode. At this time, the light-emitting device such as photosensitive chip is in a working state, that is, light is taken. The liquid crystal (ie, the third transparent part 143) corresponding to the imaging area 100 is adjusted to a high transmittance state by LCD driver. With the high transmittance of the second transparent part 142 and the fourth transparent part 144, external light can enter the corresponding camera 11 under the camera area 100 through the display panel 22 to realize the lighting function. At this time, the display area 200 is still displayed normally. A light-blocking film is disposed between the camera 11 and an light entering side of optical film 21, so the backlight of the display area 200 does not affect the normal lighting of the camera 11, and the camera 11 can work normally (see FIG. 2).

The technical effect of the present invention is that setting the camera under the display can further increase the display ratio of the display device. When the transparent light source is turned off, the imaging area is in the lighting state and can work normally. When the transparent light source is turned on, the imaging area is in the display state. At the same time, the large display area improves the user's experience.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A display device, comprising:
    an imaging area and a display area surrounding the imaging area;
    an optical film comprising a via hole;
    a display panel disposed on a surface of a side of the optical film, wherein the display panel comprises a transparent area opposite to the via hole;
    a camera inserted into the via hole and facing the transparent area;
    a transparent light source located within the via hole and between the camera and the transparent area; and
    a light-blocking film disposed on an inner peripheral wall of the via hole;
    wherein the imaging area comprises the camera, the light-blocking film, the transparent light source, and the transparent area, and the display area is an area of the display device where images are displayed excluding the imaging area;
    wherein the display panel comprises:
        an array substrate;
        a color filter substrate disposed opposite to the array substrate;
        a liquid crystal layer disposed between the array substrate and the color filter substrate;
        a first polarizer disposed on one side of the color filter substrate away from the array substrate; and
        a second polarizer disposed on one side of the array substrate away from the color filter substrate;
    wherein the transparent light source excludes thin film transistors and comprises a substrate, an anode layer, a hole injection layer, a hole transport layer, a light-emitting layer, an electron transport layer, an electron injection layer, and a cathode layer sequentially stacked on each other in a direction from bottom to top;
    wherein when the camera is working, the transparent light source is turned off to allow shooting, and when the camera is off, the transparent light source is turned on to allow display in the imaging area.

2. The display device according to claim 1, wherein the transparent area comprises:
    a first transparent part located in the first polarizer;
    a second transparent part located in the color film substrate;
    a third transparent part located in the liquid crystal layer;
    a fourth transparent part located in the array substrate; and
    a fifth transparent part located in the second polarizer;
    wherein the first transparent part, the second transparent part, the third transparent part, the fourth transparent part, and the fifth transparent part are stacked on each other and sequentially disposed in a direction from bottom to top;
    wherein the first transparent part and the fifth transparent part polarize light.

3. The display device according to claim 1, wherein the optical film comprises:
    a first film;
    a second film disposed on a surface of a side of the first film; and
    a third film disposed on a surface of the second film away from the first film.

4. The display device according to claim 3, wherein the via hole comprises:
    a first via hole penetrating through the first film;
    a second via hole penetrating through the second film; and
    a third via hole penetrating through the third film;
    wherein the first via hole, the second via hole, and the third via hole are disposed corresponding to each other.

5. The display device according to claim 1, wherein a voltage is generated between the cathode layer and the anode layer.

6. The display device according to claim 1, wherein the anode layer is made of a transparent material, and the cathode layer is made of a transparent material or a translucent material.

7. The display device according to claim 1, further comprising a light emitting diode (LED) light bar on a side of the optical film.

8. The display device according to claim 1, wherein the camera comprises a flexible circuit board, a connector, a photosensitive chip, a filter component, a lens, a support column, a focusing motor, and a camera lens.

* * * * *